C. NORLAND.
TROLLEY RETRIEVER.
APPLICATION FILED MAR. 7, 1907.
905,351.
Patented Dec. 1, 1908.
3 SHEETS—SHEET 1.
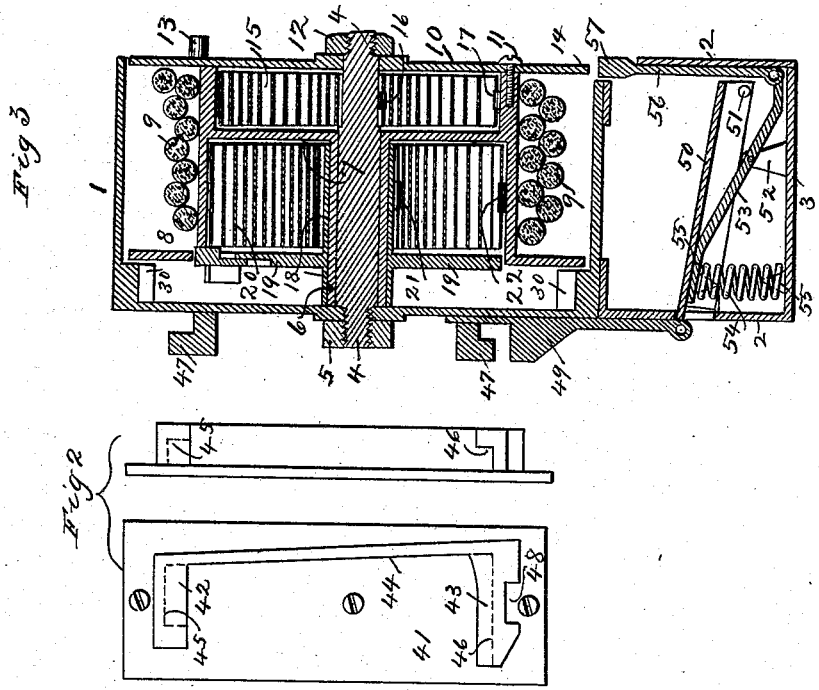
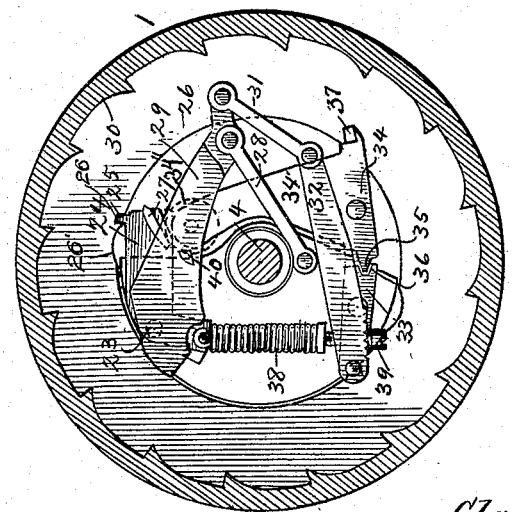
Witnesses
Inventor
Clarence Norland.
By
Attorney C. NORLAND.
TROLLEY RETRIEVER.
APPLICATION FILED MAR. 7, 1907.
905,351.
Patented Dec. 1, 1908.
3 SHEETS—SHEET 2.
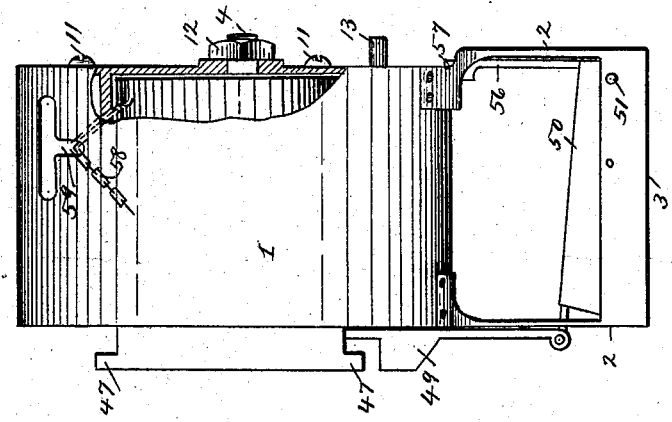
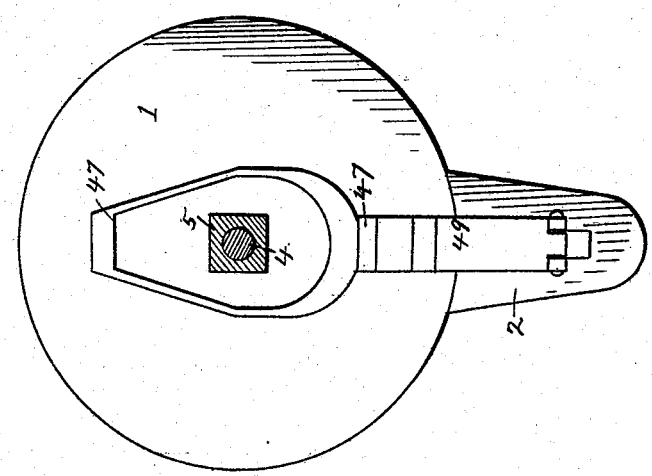
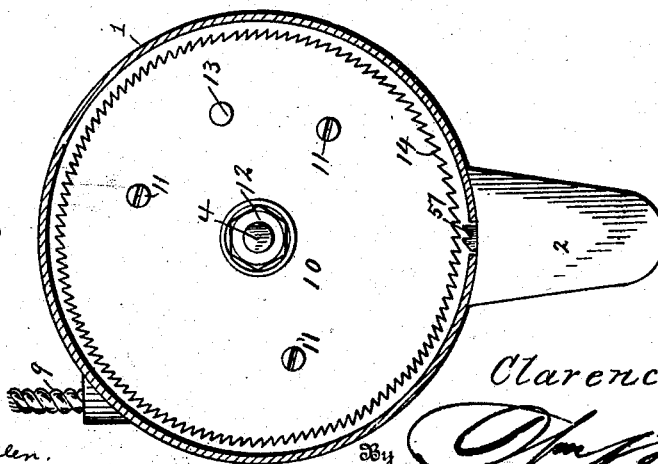
Witnesses
W. R. Edelen.
M. E. Moore.
Inventor
Clarence Norland.
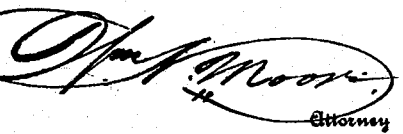
Attorney

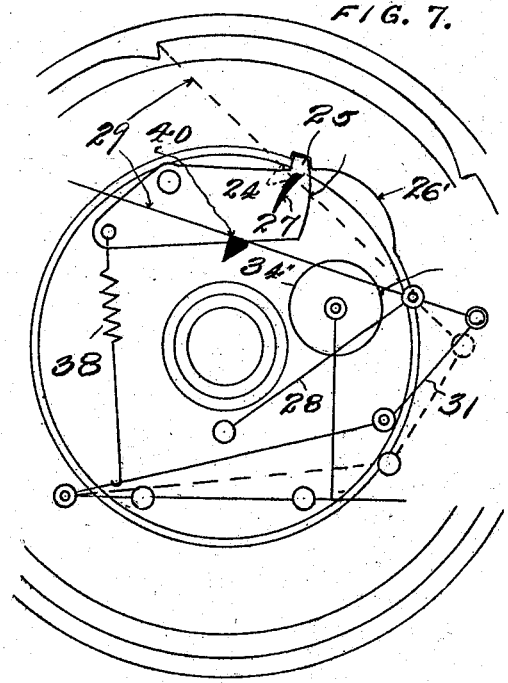
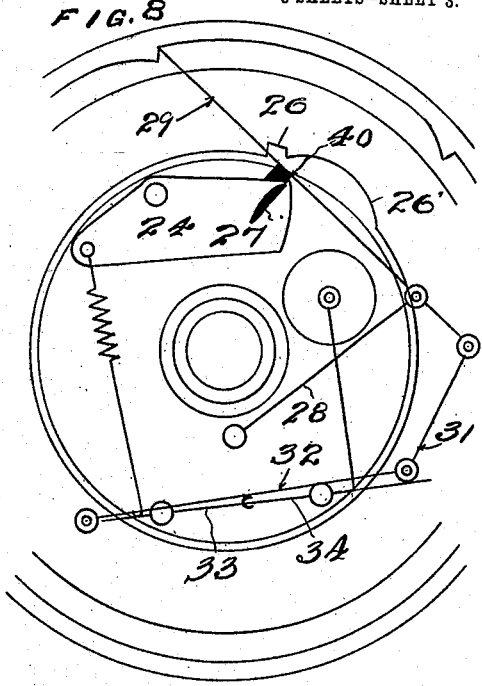
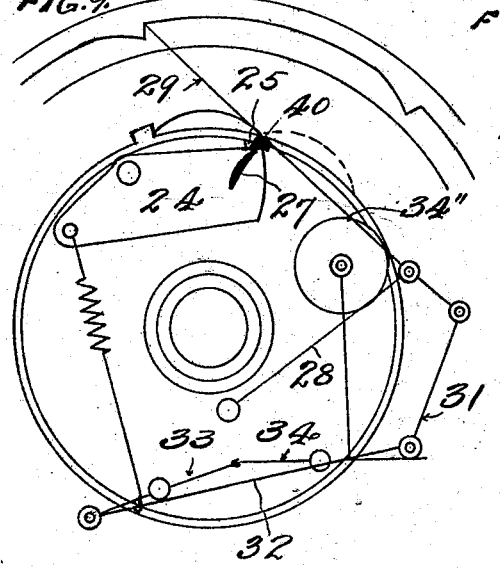
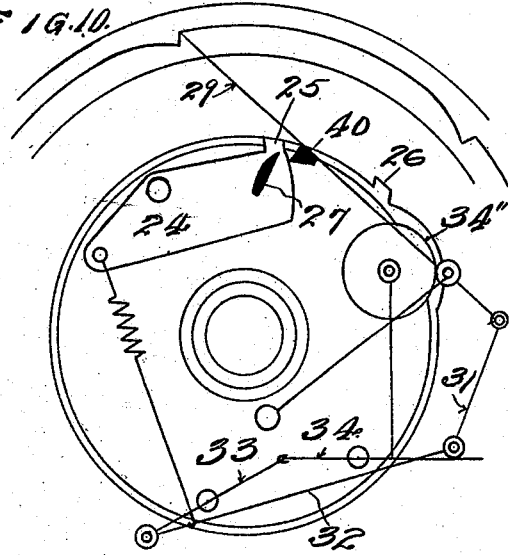

UNITED STATES PATENT OFFICE.

CLARENCE NORLAND, OF LOS ANGELES, CALIFORNIA.

TROLLEY-RETRIEVER.

No. 905,351.            Specification of Letters Patent.            Patented Dec. 1, 1908.

Application filed March 7, 1907. Serial No. 361,046.

*To all whom it may concern:*

Be it known that I, CLARENCE NORLAND, a citizen of the United States, residing at Los Angeles, in the county of Los Angeles and State of California, have invented certain new and useful Improvements in Trolley-Retrievers, of which the following is a specification.

My invention relates to improvements in trolley retrievers, and refers in particular to a device for drawing the trolley down when from any cause, the trolley has become disengaged from the trolley-wire, and also to keep proper tension on the trolley-rope.

The object of my invention is the provision of a device of the class described which may be readily set or regulated to suit different conditions, which will be simple in construction, and will be positive and effective in operation.

Other objects of the invention, are to provide practical means for detachably securing the device upon a car, simple lifting means for handling the device, and means for automatically locking the reel while carrying the device from one place to another.

With these and other objects in view my invention consists of a reel for the trolley rope, a comparatively weak spring attached to said reel for taking up the slack in the trolley rope, a comparatively strong spring secured to the reel and normally held in a strained but inoperative position, means for automatically releasing said strong spring when the trolley leaves the wire, means for locking the reel against rotation, a handle mechanism for carrying the device, means for securing the device in position, and certain other novel features of construction, combination and arrangement of parts, substantially as herein set forth.

Figure 1, is a rear elevation of the retriever, the casing being shown in section, and the handle mechanism being omitted. Fig. 2, illustrates a front and side elevation of the base plate which is adapted to be secured to the dash of a car. Fig. 3, is a vertical sectional view through the center of the device. Fig. 4, is a front elevation of my improved retriever. Fig. 5, is a rear elevation of the same. Fig. 6, is a side elevation of the complete device with parts broken away to show the manner in which the chain is attached to the reel. Figs. 7, 8, 9 and 10, are diagrammatical views illustrating the operation of the device.

Referring to the drawings in detail: The numeral 1, designates the casing of the retriever which is of convenient size and provided with the pair of downwardly projecting lugs or extensions 2, which are connected by a channeled portion 3. A shaft or spindle 4, is secured centrally in the back of the casing by means of a lock nut 5, or in any other suitable manner. A hub 6, is mounted to rotate upon said spindle, and is provided with a web 7, terminating in a reel portion or spool 8, which is adapted to receive the trolley rope 9. A disk 10, is secured to the reel by screws or suitable fastenings 11, and forms the face of the reel, a nut 12, being mounted on the outer end of the spindle and engaging the face of the disk to secure the reel within the casing. A knob or projection 13, is secured upon the disk or face of the reel to afford a convenient hand-hold for winding the reel, and the edges of the disk are formed with ratchet teeth 14, the purpose of which will be described later.

A relatively weak spring 15, is confined in the space between the web of the reel and the face plate thereof, and is secured at each end to the spindle and reel by means of fastenings 16 and 17, respectively.

Rotatively engaged upon the hub of the reel, is a second hub or sleeve 18, which carries a flange or disk 19, which forms a closure to the rear face of the reel. A comparatively strong spring 20, is confined within the space between the disk 19, and the web of the reel, said spring having its inner end secured to the hub 18 by means of the fastening 21, and its outer end to the reel, by the fastening 22.

Pivoted at 23, in a recessed portion near the outer edge of the disk, is an angular plate 24, formed at its outer corner with a ratchet tooth 25, to engage either of the pair of oppositely-disposed ratchet slots 26, in the inner periphery at the back of the reel, each of said slots having a curved recessed portion 26′, adjacent thereto. This plate is further provided with a rib or ridge 27, set at an incline with regard to the axis of the wheel. Pivoted to the rear face of the disk, below the center thereof, is a lever 28, to the free end of which, is pivoted the dog 29, which when actuated by centrifugal force, is adapted to engage the ratchet teeth 30, in the interior of the retriever casing. To the extreme end of the centrifugal dog, beyond the point of pivotal connection with the lever 28, a second lever 31, is pivoted, which in turn at its free end, is pivotally connected with a bar 32. This bar 32 at its lower end, is connected with a comparatively short bar 33, pivoted upon the disk. A second bar or plate 34, is pivoted upon the disk, said bar being provided with a cog 35, meshing in a slot 36, in the end of the bar 33. The free end of the bar 34, is hollowed or dished at 37, to receive the end of the lever 31, when the same is depressed, and said bar 34, is further provided with an angular extension 34', having a roller 34'', journaled in the end thereof and adapted to engage the inner periphery of the reel. A close coiled spring 38, is secured between the angular end of the ratchet plate 24, and the lower end of the bar 32, and the tension of said spring is adjustable by the set screw 39. Secured upon the under face of the centrifugal dog, is a lug 40, having its face on an incline to engage the inclined ridge on the ratchet plate.

The device is secured upon the car as follows:—A base plate 41, is mounted upon the dash of the car in the proper position, the said base plate being provided with the upper and lower lugs 42 and 43, respectively, connected by the ridge 44. The under face of the upper lug, is provided with a recess or pocket 45, and the upper face of the lower lug, with a recess 46, said pockets adapted to receive the oppositely-disposed hooked members 47, on the back of the retriever casing. The under side of the lower lug 43, is formed with a notch 48, for the reception of the locking slide 49, which is slidably mounted on the back of the casing. The lower end of the slide is pivoted to the protruding end of the interiorly grooved handle member 50, which at its opposite end is pivoted to the channel bar at 51. In said channel bar is provided a lug or block 52, to which is fulcrumed the lever 53, one end of the lever engaging the under face of the handle member near the point of pivotal connection with the slide. A spring 54, is confined between bearing points 55, on the lever and channel bar, thereby serving to normally hold the latch in closed position. To the opposite end of the lever, is pivotally secured the latch 56, said latch being formed with teeth 57 on its upper end to engage the ratchet teeth on the face plate of the reel and thereby secure the reel against movement. A chain 58, is secured to the body of the reel and passed out through a slot in the casing. The slot is formed with a transverse neck 59, so that the chain may be temporarily secured therein.

The slack adjuster is set by winding the reel to the proper tension, allowing the chain to drop out through the slot in the casing, and securing the trolley rope to said chain.

The retriever may then be applied to the car by grasping it by the handle portion and opening the locking slide, the hooked members on the casing being brought into engagement with the base plate. By the same action that the locking slide is opened, the latch is caused to engage the reel and prevent rotation of the same. After thus being applied to the car, the device will act simply as a slack adjuster to keep the proper tension on the trolley rope, and the retriever mechanism may be left inoperative if so desired.

To set the retriever portion of the device, the trolley rope is given a quick pull, which causes rapid rotation of the reel and causes the centrifugal dog to fly outwardly and engage one of the projections on the interior of the casing. In this movement, the lug on the under face of the dog engages the rib on the ratchet disk, and by the inclination thereof, causes the ratchet disk to be forced inwardly out of engagement with the reel. The centrifugal dog thus locks the disk stationary and the inner end of the retriever spring which is secured to said disk, while the outer end of the spring is secured to the reel and revolves therewith. This quick pull on the trolley rope, as stated, causes rapid rotation of the reel and by reason of such rapid rotation, the roller does not enter the long slot in the rim of the reel until the spring is nearly wound up and the speed of rotation of the reel necessarily becomes more slow. When the speed of rotation becomes sufficiently slow, the roller will enter one of the long slots and free the ratchet 24. If then the retriever spring is not under sufficient tension, the trolley rope is given another quick pull and the retriever spring set by degrees until it is placed under proper tension. When the retriever spring has been brought under sufficient tension to overcome the tension of the springs on the trolley pole, the pull on the rope is released. When this pull is released, the centrifugal dog returns toward the center and the coiled spring causes the ratchet plate to engage the reel and lock the reel and disk together.

When the centrifugal dog is thrown outward by reason of centrifugal force, it pivots upon the end of the link 28 as a center and the outer end of the dog depresses the link 31, which in turn depresses the longer link 32. As this longer link 32, is connected to the spring 38, the spring is distended by the centrifugal movement of the dog and is under strain while the dog is in such position, so that as soon as the centrifugal pull ceases, the tension of the spring causes the dog to return toward the center.

The retriever disk and spring normally rotate with the reel, but as soon as the trolley leaves the wire, or the trolley rope is given a sudden pull, the centrifugal dog is thrown outward and engages one of the teeth on the interior of the casing. The lug on the underface of the centrifugal dog is then in engagement with the inclined ridge on the ratchet plate and the ratchet is thereby lifted slightly from engagement with the ratchet slot. This sudden stopping of the reel and disk causes the tension spring 38 to yield slightly, thereby allowing a slight further rotation of the disk, which causes the inclined ridge on the ratchet plate to ride over the face of the lug on the dog, and the ratchet plate is then freed from the reel. The disk is now locked stationary, the reel is unlocked from the disk and the retriever spring is free to act on the reel to rewind the trolley rope. When the retriever spring commences to act, a greater torsional strain is placed upon the dog and the levers carrying the dog yield in a downward and outward direction, the end of the lever 31, engaging the hollowed end of the bar 34, and forcing the roller carried by said bar in engagement with the smooth part of the inner periphery of the reel. The roller serves to check the spreading effect of the levers and the spring 38, is placed under greater tension by reason of this spreading effect. The retriever spring has now had time to act and has rewound the trolley rope drawing the trolley down against the tension of the trolley springs. The roller is now forced into one of the long slots in the periphery of the reel, allowing the levers to yield slightly, and the ridge on the ratchet plate slips past the lug on the dog, freeing the ratchet plate and allowing the ratchet to interlock with the next ratchet slot and lock the reel and disk together again. The roller will only engage the long slot in the reel after the speed of rotation of the reel has lessened somewhat, when the trolley has been drawn down to place, and in this way the roller acts as a temporary check to hold the ratchet plate inoperative until the trolley has been drawn down to place. At the time the disk and reel are freed, the disk, levers and dog are stationary, owing to the fact that the roller is engaged with the track or smooth portion of the periphery of the reel. The long slots are always in a fixed position, for if a slot should be directly under the roller at the time the trolley comes off, the sudden quick jerk would force the roller into the slot, which would reset the retriever. But the roller being on the track, the sudden pull of the trolley, has no effect upon it.

The tension means for regulating the retriever spring is indirectly connected but directly operated by the centrifugal dog, and the dog may be regulated by varying the tension of the coiled spring.

From the foregoing description taken in connection with the drawings, it will be apparent that I have provided a device which accomplishes all the conditions herein disclosed as the objects of the invention, and have produced a simple, practical and effective trolley retriever.

I claim:

1. In a trolley retriever, the combination with a casing and a reel mounted therein, a slack-adjusting spring connected to said reel, of a retriever spring normally inoperative and rotating bodily with the reel, means operated by centrifugal force to temporarily render the retriever spring operative to rotate the reel, a handle mechanism, a base plate for the device, and means automatically operated by the handle mechanism to secure the device to the base plate and simultaneously unlock the reel.

2. In a trolley retriever, the combination with a casing and a reel therein, of a slack-adjusting spring, a retriever spring operative only upon sudden rotation of the reel, means for winding the reel, a handle mechanism, means for locking the device upon a car, means operated from the handle mechanism to release said locking means, and means also operated by the handle mechanism for locking the reel during such removal.

3. In a trolley retriever, the combination with a casing and a reel therein, a slack-adjusting spring, a rotative element independent of the reel, a retriever spring carried by said element, a ratchet carried by the element to engage the reel, tension means for said ratchet, a centrifugal dog pivotally connected to the element and adapted to engage the casing, at the same time depressing the ratchet from engagement with the reel, and lever connections operated by the centrifugal dog to increase the strain on the tension means.

4. In a trolley retriever, the combination with a casing, a reel mounted therein and provided with slack-adjusting means and retrieving means, projections on the back of the casing adapted to engage suitable recesses in a base plate, a locking slide operating in conjunction with said projections, a handle to the casing, gripping means in said handle adapted to operate the locking slide, and means operated by the said lever to engage the reel.

5. The combination with a casing, of a reel mounted therein and provided with slack-adjusting means, retrieving means connected to the reel, normally inoperative and operated by centrifugal force, means for winding the reel, catches on the back of the casing and a locking slide acting in conjunction therewith, a latch for engagement with the reel to lock the same, a handle and gripping mechanism in the handle, said gripping mechanism connected to and adapted to simultaneously release the locking slide and cause the latch to engage the reel.

6. The combination with a casing and a reel mounted therein, a slack-adjusting spring secured to the reel, an integral hub and disk independently rotative of the reel, a retriever spring secured between the hub and reel, a ratchet carried by the disk normally engaging the reel and provided with an inclined ridge, tension means for the ratchet, a centrifugal dog pivotally connected to the disk and adapted to engage teeth on the interior of the casing, lever connections between the dog and tension means whereby when the dog is actuated, the strain on the tension means is increased, said dog having a projection to engage the inclined ridge on the ratchet and depress the same from engagement with the reel.

7. The combination with a casing and a reel mounted therein, a slack-adjusting spring for the reel, retrieving mechanism independently rotative of the reel, a ratchet carried by said mechanism normally in engagement with the reel, a tension spring for the ratchet, a centrifugal dog pivotally connected to the retrieving mechanism adapted to depress the ratchet from engagement with the reel, of lever connections between said dog and the tension spring adapted to place the tension spring under greater strain when the dog is actuated.

8. The combination with a casing provided with a handle and having a reel therein, securing projections on the back of the casing, a locking slide acting in conjunction with the securing projections, of a grip pivoted in the handle and connected with the slide, a spring-pressed lever pivoted in the handle and adapted to be depressed by the grip, and a latch pivoted to said lever and adapted for locking engagement with the reel.

9. In a trolley retriever, the combination with a casing containing retrieving and slack-adjusting means, of locking means for securing the casing in position, a handle to the casing, and mechanism in the handle for controlling the locking means.

10. In combination with the casing of a trolley retriever or like device, of locking means for securing the casing in position, a handle to the casing, and means in the handle for controlling the locking means.

11. In combination with the casing of a trolley retriever and a reel located therein, of locking means for securing the casing in position, a handle to the casing, means in the handle for operating the locking means, and a lock to hold the reel stationary with respect to the casing also actuated by the operating means in the handle.

12. In combination with a casing and a handle thereto, a base plate, catches on said casing to interlock with corresponding catches on the base plate, a slide to lock the casing in engagement with the catches, and a grip piece in the handle having operative connection with the slide.

13. In combination with a casing and a handle thereto, a reel in the casing, a lock for the reel, a base plate, interlocking catches on the casing and base plate, a slide to coöperate with the catches to hold the casing to the base plate, a grip piece in the handle, the slide and lock both having operative connection with the grip piece.

14. In combination with the casing of a trolley rope holder and a reel mounted therein, of a lock for the reel, a handle to the casing, and means in the handle to control said reel lock.

15. In combination with the casing of a trolley rope holder and a reel mounted therein, of a handle to the casing, means for locking the casing in position upon a car or other place, and means carried by the handle of the casing for controlling such locking means.

16. In combination with the casing of a trolley rope holder and a reel mounted therein, of means for locking the casing in operative position, a handle to the casing, means for locking the reel stationary in the casing, both of said locking means being controlled from the handle.

17. In combination with a casing, a locking slide for securing the casing in position, a handle to the casing and a grip piece in the handle, the grip piece being operatively connected to the locking slide, and a spring serving to hold the grip piece and slide in normal position.

18. In combination with a casing and a base plate having interlocking catches, a slide coöperating with the catches to hold the casing to the base plate, a handle to the casing and a grip piece in the handle, the grip piece being operatively connected to the locking slide, a reel mounted in the casing, a lock to hold the reel stationary, said reel lock also being operatively connected to the grip piece, and a spring acting on the grip piece to hold the reel lock normally inoperative and the locking slide normally operative.

19. A trolley retriever comprising a casing, a reel mounted therein, a slack adjusting spring and a retriever spring connected to the reel, of means operable under influence of centrifugal force to render the retriever spring operative, and means controlled under slower speed of rotation of the reel to render the retriever spring inactive.

20. A trolley retriever comprising a casing, a reel mounted therein, a slack adjusting spring and a retriever spring connected to the reel, a disk rotative independent of the reel, means normally locking the disk and reel together, means operable under influence of centrifugal force to disengage the locking means from the reel and permit operative action of the retriever spring, and means acting under the slower rotation of the reel to again allow engagement of the locking means with the reel.

21. A trolley rope holder comprising a casing, a reel journaled therein, a slack adjusting spring for the reel, a supporting member, a retriever spring carried by said supporting member and having connection with the reel, means normally locking the supporting member and reel together, means operable under influence of centrifugal force to lock the supporting member stationary and free the locking means to render the retriever spring operative, tension means for the locking means and the centrifugally operated means, and means mounted on the supporting member to again permit operative engagement of the locking means.

22. In combination, a casing and a reel mounted therein, a slack adjusting spring for the reel, a rotatable supporting member, a retriever spring connected between said member and the reel, means for normally locking the supporting member and reel together, a dog for locking the supporting member stationary and adapted to free the locking member to render the retriever spring operative, means adapted to again permit operative engagement of the locking means, a handle to the casing, and locking means in connection with the handle.

In testimony whereof I have signed my name to this specification in the presence of the subscribing witnesses.

CLARENCE NORLAND.

Witnesses:
C. M. STEPHENS,
CALVERT WILSON,
TAYLOR O. TAYLER.